United States Patent
Cheng et al.

(10) Patent No.: US 10,002,626 B1
(45) Date of Patent: Jun. 19, 2018

(54) CORROSION RESISTANCE CAP LOCATED ON END OF WAVEGUIDE CORE

(71) Applicant: Seagate Technology LLC, Cupertino, CA (US)

(72) Inventors: Yuhang Cheng, Edina, MN (US); Chubing Peng, Eden Prairie, MN (US); Tae-Woo Lee, Eden Prairie, MN (US); Xiaoyue Huang, Eden Prairie, MN (US); Song Chen, Edina, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days. days.

(21) Appl. No.: 15/493,306

(22) Filed: Apr. 21, 2017

Related U.S. Application Data

(60) Provisional application No. 62/333,354, filed on May 9, 2016.

(51) Int. Cl.
  *G11B 11/00* (2006.01)
  *G11B 5/31* (2006.01)
  *G11B 5/48* (2006.01)

(52) U.S. Cl.
  CPC ............ *G11B 5/314* (2013.01); *G11B 5/4866* (2013.01)

(58) Field of Classification Search
  None
  See application file for complete search history.

(56) References Cited

U.S. PATENT DOCUMENTS

| | | | |
|---|---|---|---|
| 8,400,902 B2 | 3/2013 | Huang et al. | |
| 8,405,932 B2 | 3/2013 | Seigler et al. | |
| 8,773,956 B1* | 7/2014 | Wang | G11B 5/314 369/13.01 |
| 8,787,126 B2 | 7/2014 | Gokemeijer et al. | |
| 9,053,737 B2 | 6/2015 | Huang et al. | |
| 9,147,406 B1 | 9/2015 | Wessel | |
| 2014/0340183 A1* | 11/2014 | Nakada | H01L 43/02 336/30 |
| 2014/0376342 A1* | 12/2014 | Wessel | G02B 6/1226 369/13.33 |
| 2015/0117169 A1* | 4/2015 | Kautzky | G11B 5/4866 369/13.33 |
| 2015/0279399 A1* | 10/2015 | Chen | G11B 5/6088 369/13.32 |

* cited by examiner

*Primary Examiner* — Peter Vincent Austin
(74) *Attorney, Agent, or Firm* — Hollingsworth Davis, LLC

(57) ABSTRACT

A waveguide core extends from an input coupler towards a media-facing surface of a read/write head. A cap is located between a terminating end of the waveguide core and the media-facing surface. The cap is formed of a high index of refraction, high-corrosion resistant material that is different than a material used to form the waveguide core. A near-field transducer is proximate the cap in a down-track direction. A head overcoat on the media-facing surface covers the cap.

20 Claims, 9 Drawing Sheets

CORROSION RESISTANCE CAP LOCATED ON END OF WAVEGUIDE CORE

RELATED PATENT DOCUMENTS

This application claims the benefit of Provisional Patent Application Ser. No. 62/333,354 filed on May 9, 2016, to which priority is claimed pursuant to 35 U.S.C. § 119(e), and which is incorporated herein by reference in its entirety.

SUMMARY

The present disclosure is directed to a corrosion resistance cap located on an end of a waveguide core. In one embodiment, a waveguide core extends from an input coupler towards a media-facing surface of the read/write head. A cap is between a terminating end of the waveguide core and the media-facing surface. The cap is formed of a high index of refraction, high-corrosion resistant cap material that is different than a material used to form the waveguide core. The cap material includes a compound with one of Ta, Hf, Zr, Si, and Y. A near-field transducer is proximate the cap in a down-track direction, and a head overcoat is on the media-facing surface and covers the cap.

In another embodiment, a waveguide core extends from an input coupler towards a media-facing surface of the read/write head. A cap is between a terminating end of the waveguide core and the media-facing surface. The cap is formed of a high index of refraction, high-corrosion resistant cap material that is different than a material used to form the waveguide core. An interface between the cap and the terminating end of the waveguide core is at an oblique angle to the media-facing surface and lies on a cross-track parallel line such that the cap has a right trapezoidal cross-section in a plane normal to the cross-track parallel line. A near-field transducer is proximate the cap in a down-track direction, and a head overcoat is on the media-facing surface and covers the cap.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to data storage devices that utilize magnetic storage media, e.g., disks. Data storage devices described herein use a particular type of magnetic data storage known heat-assisted magnetic recording (HAMR), also referred to as energy-assisted magnetic recording (EAMR), thermally-assisted magnetic recording (TAMR), and thermally-assisted recording (TAR). This technology uses an energy source such as a laser to deliver light to a near-field transducer (NFT) via an integrated waveguide. Surface plasmons are directed from the NFT to create a small hotspot (e.g., on the order of 10-50 nm) on a magnetic disk during recording. The heat lowers magnetic coercivity at the hotspot, allowing a write transducer to change magnetic orientation, after which the hotspot is allowed to rapidly cool. Due to the relatively high coercivity of the medium after cooling, the data is less susceptible to data errors due to thermally-induced, random fluctuation of magnetic orientation known as the superparamagnetic effect.

Figure 1:
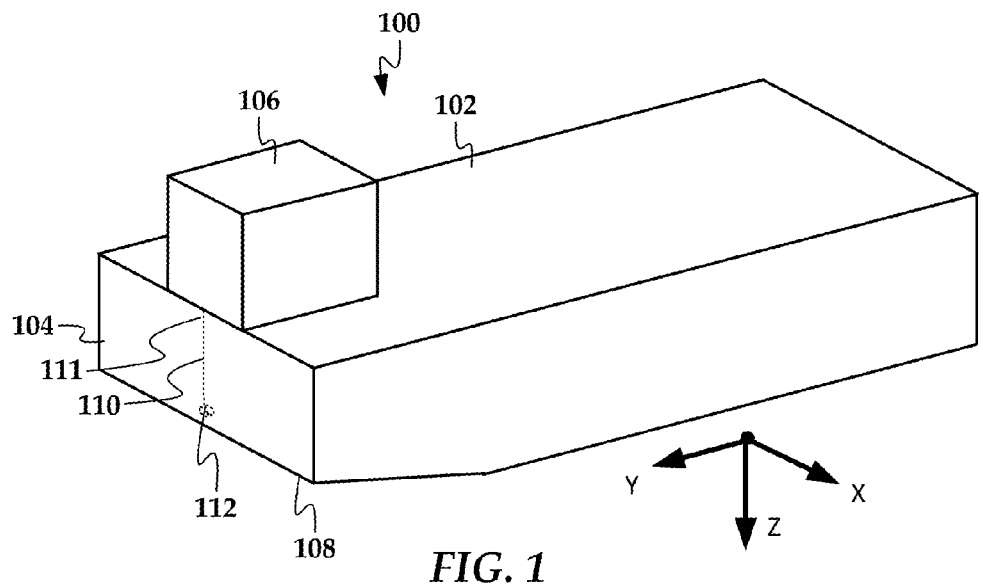
FIG. 1 is a perspective view of a slider assembly according to an example embodiment.

The present disclosure relates to a waveguide core used in a HAMR write head. The core includes features that increased corrosion resistance at a media-facing surface of the write head. In reference now to FIG. 1, a perspective view shows a read/write head 100 according to an example embodiment. The read/write head 100 may be used in a magnetic data storage device, e.g., HAMR hard disk drive. The read/write head 102 may also be referred to herein interchangeably as a slider, write head, read head, recording head, etc. The read/write head 100 has a slider body 102 with read/write transducers at a trailing edge 104 that are held proximate to a surface of a magnetic recording medium (not shown), e.g., a magnetic disk.

The illustrated read/write head 100 is configured as a HAMR device, and so includes additional components that form a hot spot on the recording medium near the read/write transducer 108. These components include an energy source 106 (e.g., laser diode) and a waveguide 110. An input coupler 111 (e.g., input facet and tapered waveguide portion with features that focus light to the waveguide 110) couples electromagnetic energy from the energy source 106 to the waveguide 110. The waveguide 110 delivers the electromagnetic energy to an NFT 112. The NFT achieves surface plasmon resonance and directs the energy out of a media-facing surface 108 to create a small hot spot on the recording medium. The media-facing surface 108 is also sometimes referred to as an air-bearing surface (ABS).

Figure 2:
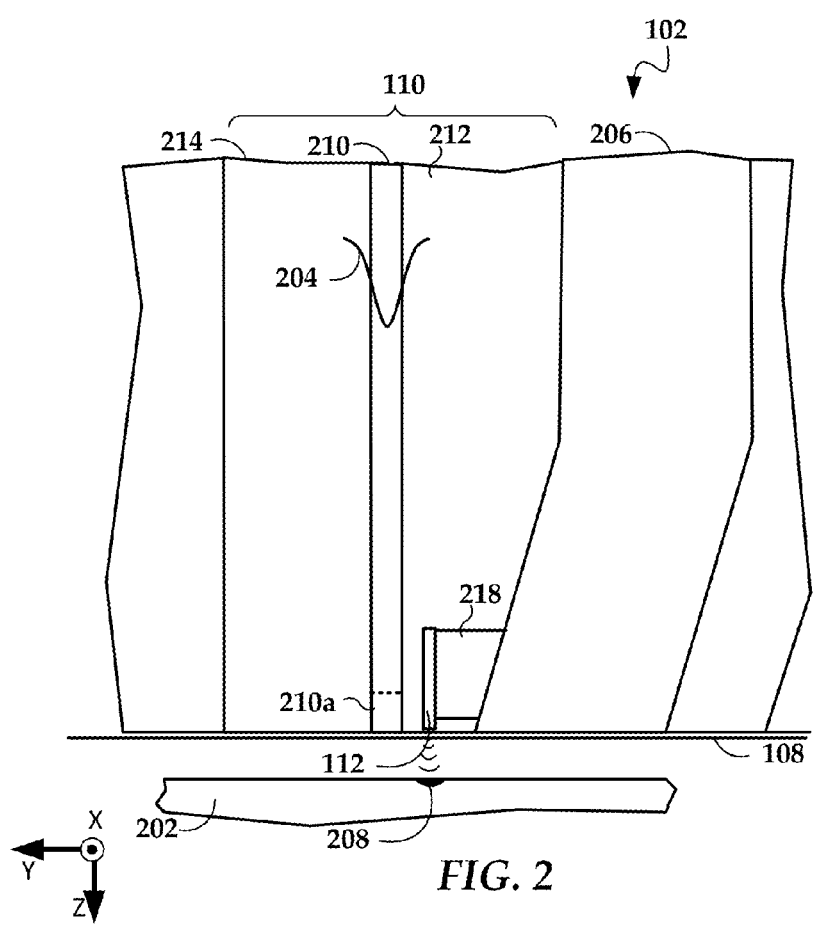
FIG. 2 is a cross-sectional view of a slider trailing edge according to an example embodiment.

In FIG. 2, a cross-sectional view illustrates portions of the slider body 102 near the near-field transducer 112 according to an example embodiment. The waveguide 110 delivers electromagnetic energy 204 to the NFT 112, which directs the energy 204 to create a small hot spot 208 on a recording medium 202. A magnetic write pole 206 causes changes in magnetic flux near the media-facing surface 108 in response to an applied current. Flux from the write pole 206 changes a magnetic orientation of the hot spot 208 as it moves past the write pole 206 in the downtrack direction (y-direction).

The waveguide 110 includes a core 210 surrounded by cladding layers 212, 214. To confine laser energy in the core 210 and effectively couple laser energy to the NFT 112, the core 210 may be made from a dielectric with high index of refraction and low extension coefficient. For example, core materials may include $Ta_2O_5$ (tantalum oxide), $TiO_2$ (titanium oxide), $Nb_2O_5$ (niobium oxide), $Si_3N_4$ (silicon nitride), SiC (silicon carbon), $Y_2O_3$ (yttrium oxide), ZnSe (zinc selenide), ZnS (zinc sulfide), ZnTe (zinc telluride), $Bi_4Ti_3O_{12}$ (bismuth titanate), GaP (gallium phosphide), CuO (copper oxide), and Si (silicon), etc. The cladding layers 212, 214 may each be formed of a dielectric material having a refractive index lower than the core, such as $Al_2O_3$ (aluminum oxide), SiO, $SiO_2$ (silica), SiOxNy (silicon oxynitride), MgO, and AlN (aluminum nitride).

During writing, energy emitted from the read/write head 100 interacts with lubricants on the media surface, causing decomposition of fluorine contained within the lubricant. Decomposition of the fluorine creates reactive ions that can combine with moisture in the air, thereby producing HF acid. A head over coat (e.g., diamond-like carbon) may be applied on the media-facing surface 108 in order to protect components exposed at this surface. However, mechanical interaction between head and media could damage the head over coat. Also, defects may exist in the head over coat when the head over coat thickness is in the nm range. If HF acid manages to penetrate the head over coat, it reacts with core 210 causing damage.

Figure 3:
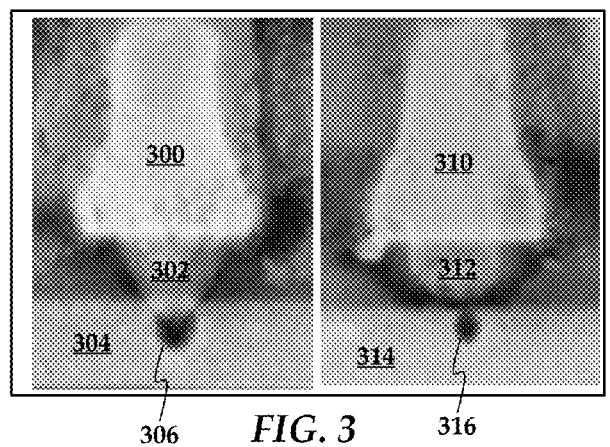
FIGS. 3 and 4 are electron microscope images showing examples of waveguide core damage.
Figure 4:
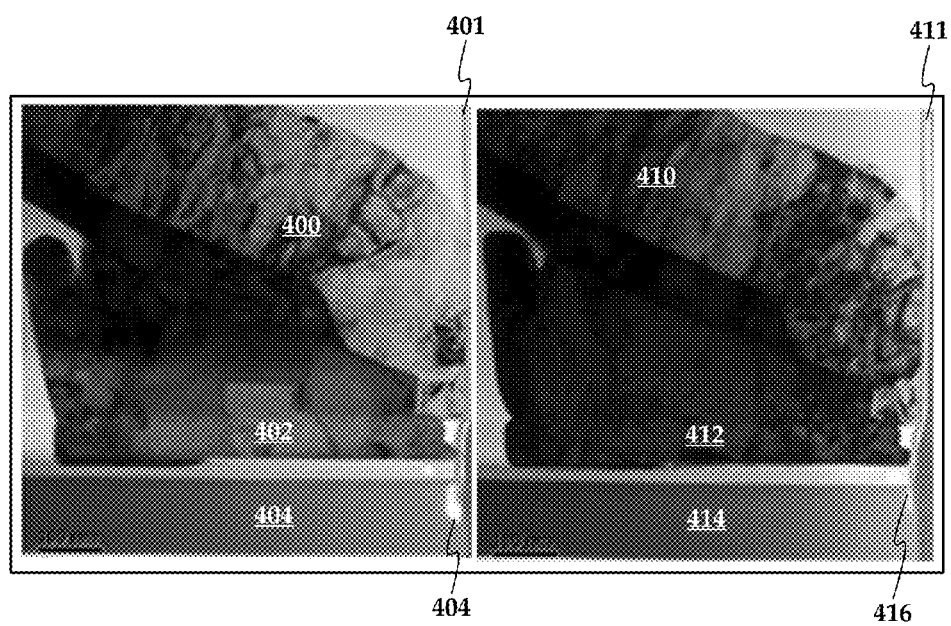

In FIGS. 3 and 4, electron microscope images show examples of waveguide core damage as described above. In FIG. 3, images show write poles 300, 310, NFTs 302, 312, and waveguide cores 304, 314 as seen from the ABS. Voids 306, 316 can be seen in the cores 304, 314 near the NFTs 302, 312. In FIG. 4, images of a cross section of a read/write head near respective ABS 401, 411 show write poles 400, 410, NFTs 402, 412, and waveguide cores 404, 414. Voids 406, 416 can be seen in the cores 404, 414 near the NFTs 402, 412. These voids can adversely affect head performance and lifetime.

Figure 5:
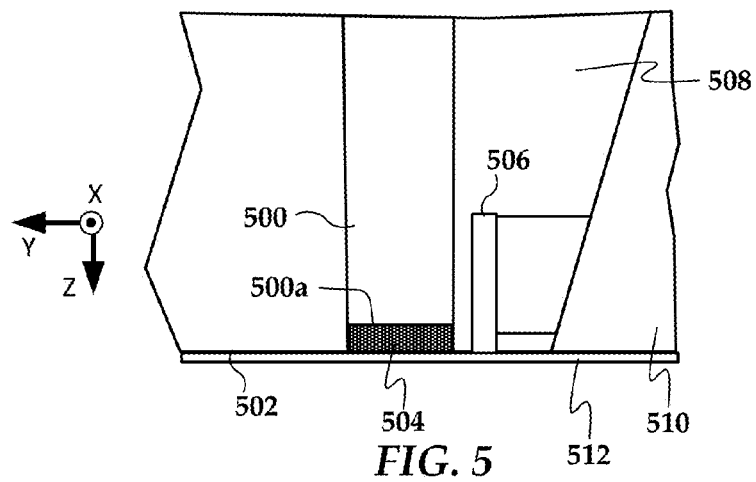
FIGS. 5, 6, 7, and 8 are cross-sectional views showing waveguide caps according to example embodiments.

In embodiments described herein, a section of material (e.g., section 210a in FIG. 2) with high corrosion resistance is added to the ABS side of a waveguide core. This corrosion-resistant material will be referred to herein as a "cap." Examples embodiments are shown in the cross-sectional views of FIGS. 5, 6, and 7. In FIG. 5, a waveguide core 500 extends from an input coupler (see, e.g., input coupler 111 in FIG. 1) to a media-facing surface 502 of a read/write head. A cap 504 is located between a terminating end 500a of the waveguide core 500 and the media-facing surface 502. The cap is 504 formed of a high index of refraction, high-corrosion resistant material that is different than a material used to form the waveguide core. For example, the cap material may be a compound that includes one of Ta, Zr, Hf, Y, Ti, and Si combined with at least one of O and N. In particular embodiments, the cap material may be TaO, TaSiO, TaTiO, ZrO2, HfO2, TaZrO, YSZ, SiC. In another embodiment, the cap may be a metal with high corrosion resistance and oxidation resistance, such as Pt, Rh, Ir, Ru, Au, Pd, Ta, Hf, Zr, Pt, and Y.

A near-field transducer 506 is located near the waveguide core 500, e.g., in a cladding layer 508 between the core 500 and a write pole 510. The near-field transducer 506 is also near the cap 504, both components having edges exposed at the media-facing surface 502. A head overcoat 512 is formed over the media-facing surface 502. The head overcoat 512 covers the cap 504 and the near-field transducer 506. While the head overcoat 512 provides some protection, the cap 504 further protects the core 500. The cap 504 has high corrosion resistance to HF acid, water vapor, and other reactive chemicals.

Figure 6:
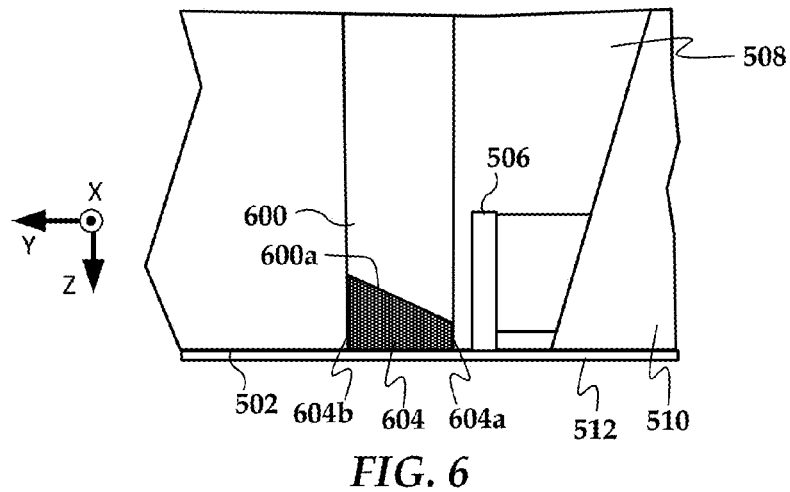
Figure 7:
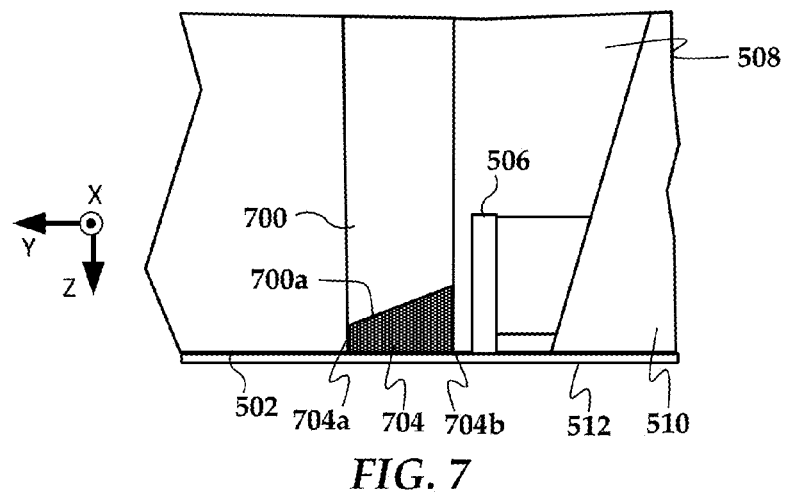

As seen in FIG. 5, the interface between the cap 504 and the core end 500a is parallel to the media-facing surface. In some cases, it may be difficult to manufacture this parallel interface. As seen in FIGS. 6 and 7, ends 600a, 700a of waveguide cores 600, 700 join respective caps 604, 704 via sloped interfaces. In both these examples, the ends 600a, 700a are at an oblique angle and include surfaces that lie on cross-track parallel lines (lines along the x-direction). Other components in FIGS. 6 and 7 have the same reference numbers as analogous components in FIG. 5, and are described above.

In FIG. 6, the cap 604 has a right trapezoid shape when viewed from a yz-plane cross section, which is a plane normal to a cross-track parallel line (along the x-direction) as described above. A short edge 604a of the trapezoid faces the near-field transducer 506, and in some embodiments the short edge has a length greater than 5 nm. In such an embodiment, a long edge 604b of the trapezoid has a length of smaller than 50 μm, e.g., 10 μm, 1 μm or even less. The interface 600a could be linear as shown, or curved. In FIG. 7, the cap 704 also has right trapezoid shape. In this case, however, a long edge 704b of the trapezoid faces the near-field transducer 506, and a short edge 604a faces away. The interface 700a could be linear as shown, or curved.

Figure 8:
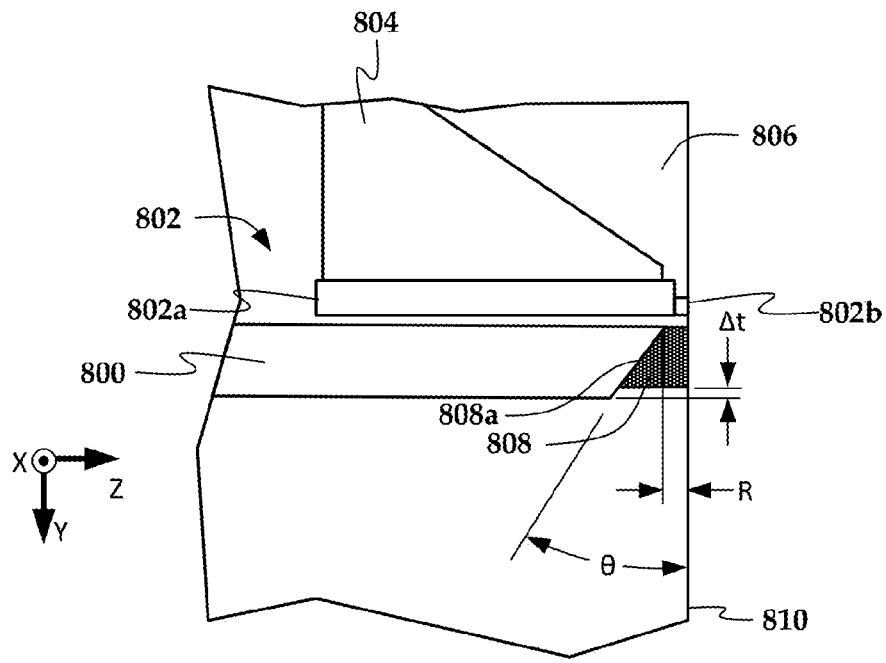

Two example configurations of a core end cap were modeled to validate effectiveness of the design. In FIG. 8, a cross-sectional view shows details of a first example configuration used in modeling. A waveguide core 800 formed of NbOx is 120 nm thick (y-dimension) and 850 nm wide (x-dimension). An Au near-field transducer 802 has a stadium-shaped disk 802a that is 420 nm wide and 620 nm long on the xz-plane, which is a substrate-parallel plane. The long axis of the disk 802a extends along the z-direction. A peg 802b extends from the disk 802a. The peg 802 b is 55 nm wide (x-dimension) and 25 nm thick (y-dimension). Both peg and disk 802a-b are made of gold, as is a heat sink 804 that thermally couples the near-field transducer 802 to a write pole 806.

A cap structure 808 is formed of TaOx and is deposited before the core 800. The cap structure 808 is thinner than the core 800, as indicated by dimension Δt. This change in thickness is due to over-etch of the cap structure 808 when forming interface surface 808a. For purposes of modeling the design, the angle θ of the interface surface 808a was set to a range between 0-70 degrees. The recess R of the core 800 from the media-facing surface 810 was modeled at 20, 40, and 60 nm.

Figure 9:
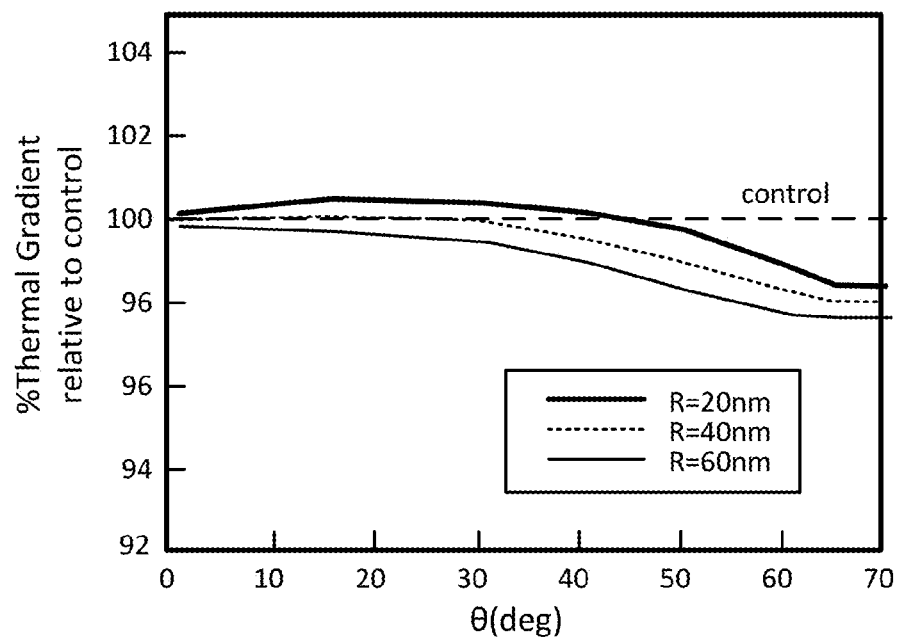
FIGS. 9, 10, and 11 are graphs showing results of modeling the configuration of FIG. 8.
Figure 10:
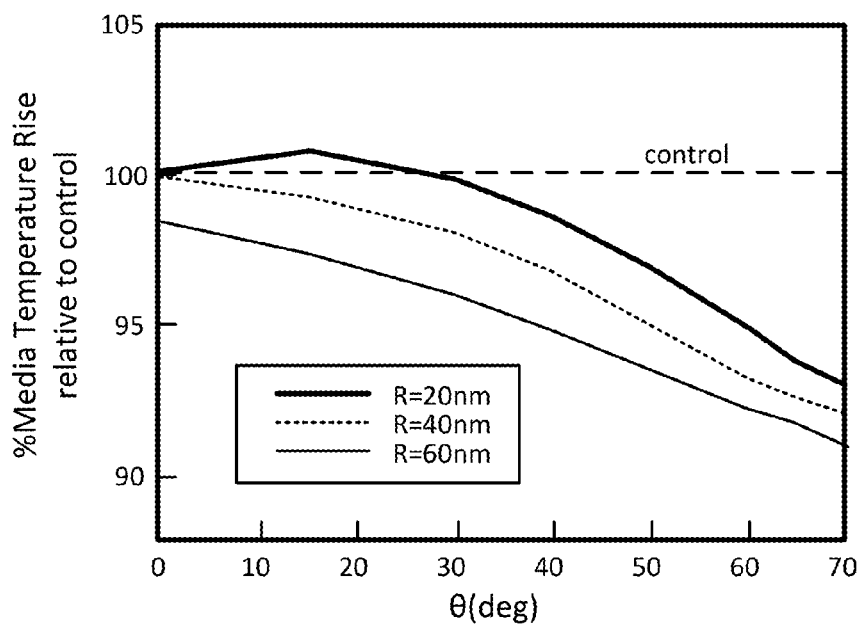
Figure 11:
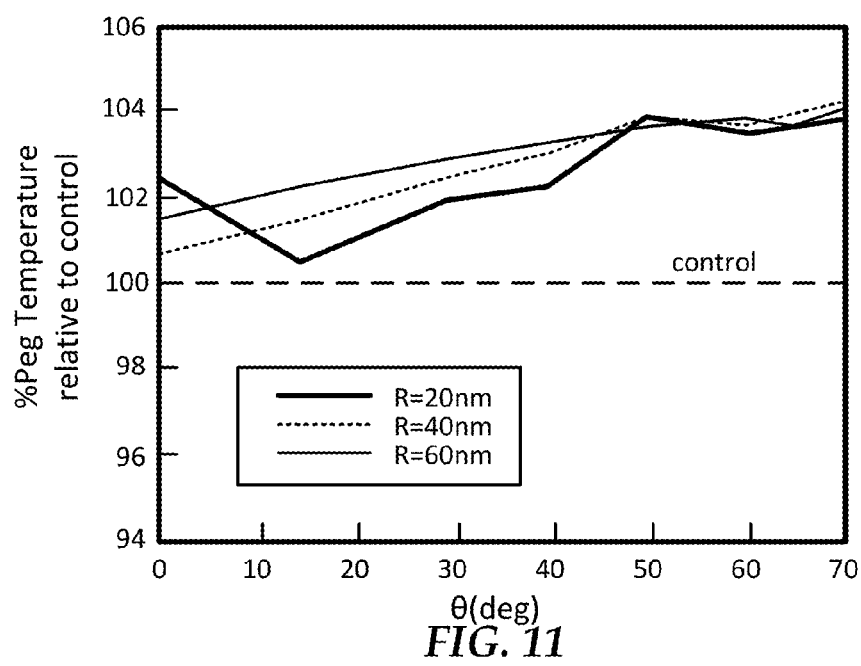

In FIGS. 9, 10, and 11, graphs show results of modeling the configuration of FIG. 8. In FIG. 9, a graph shows thermal gradient (wTG) relative to a control model in which no cap is used on the end of the core. The results are shown for different values of recess R and angle θ of the interface surface 808a. The graphs in FIGS. 10 and 11 show similar results for media temperature (wMT) and peg temperature. These show that a cap can be used that has minimal impact of thermal gradient, media temperature and peg temperature. An optimum design that is within tolerances of current processes is R=20 nm and θ=15 degrees. In some embodiments, these values may be extended to R<40 nm and θ<30 degrees, and even higher values of R and/or θ may be used.

Figure 12:
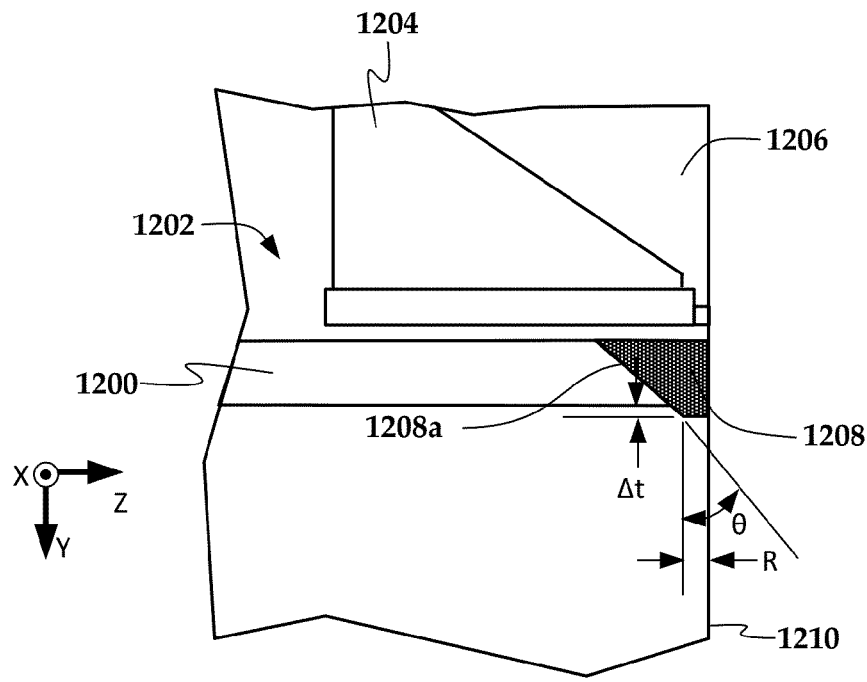
FIG. 12 is a cross-sectional view showing a waveguide cap according to another example embodiment.
Figure 13:
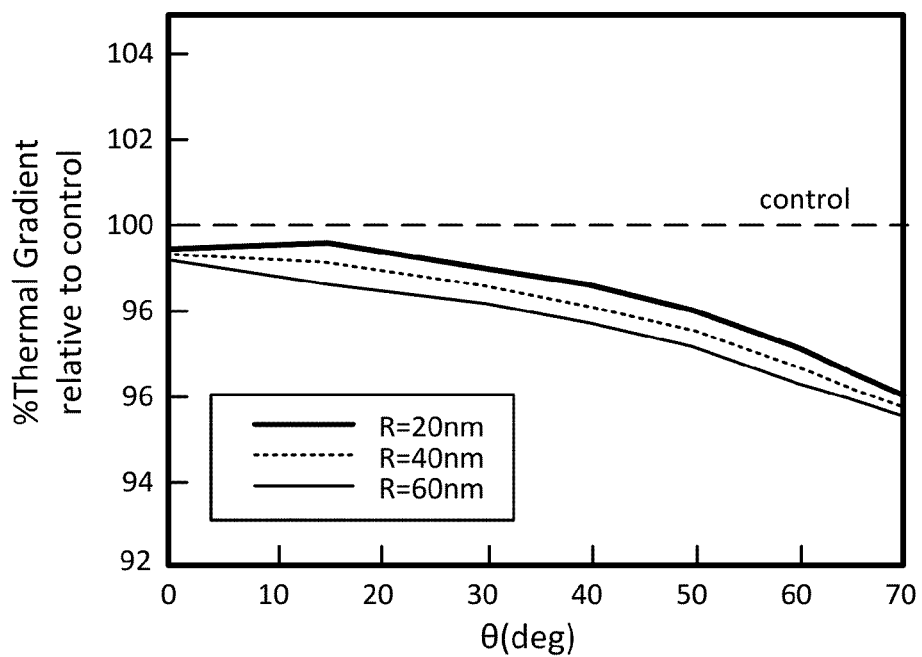
FIGS. 13, 14, and 15 are graphs showing results of modeling the configuration of FIG. 8 and FIGS. 16 and 17 are flowcharts of methods according to example embodiments.
Figure 14:
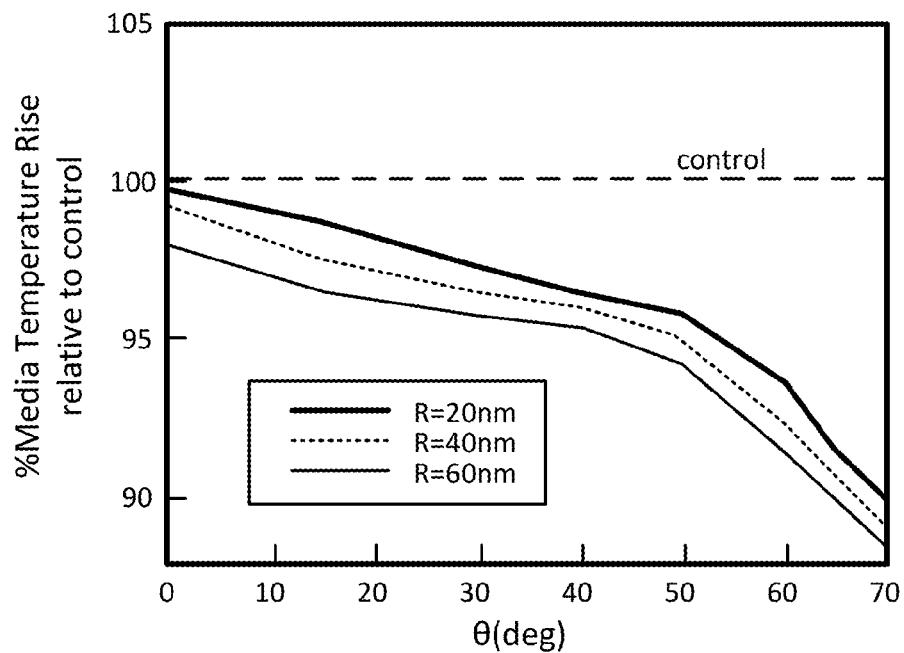
Figure 15:
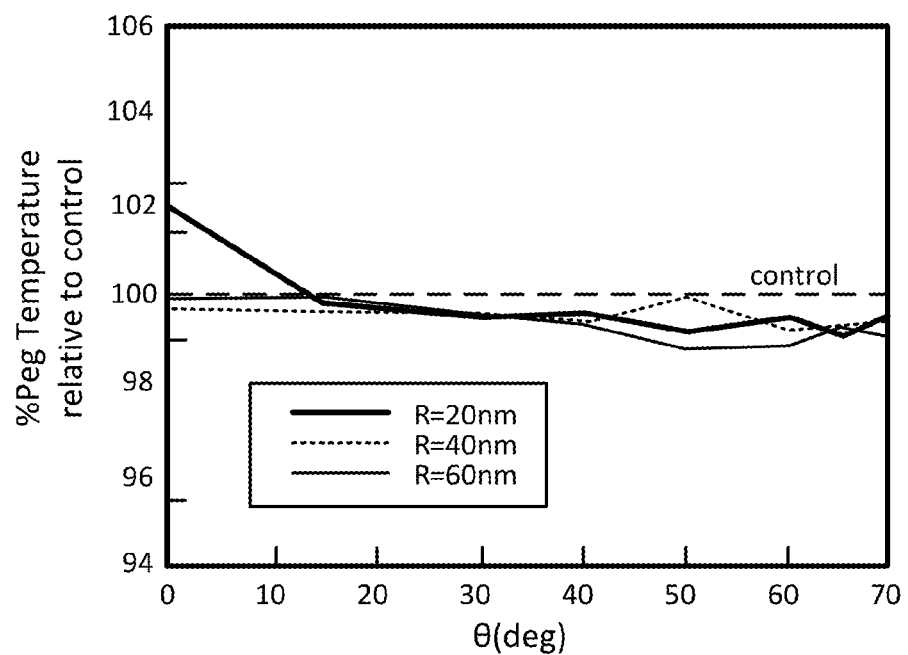

In FIG. 12, a cross-sectional view shows details of a first example configuration used in modeling. A waveguide core 1200, near-field transducer 1202, heat sink 1204, write pole 1206 have the same dimensions and are made of the same materials as corresponding components shown in FIG. 8. A cap structure 1208 is formed of TaOx and is deposited after the core 1200. The cap structure 1208 is thicker than the core 1200, as indicated by dimension Δt. This change in thickness is due to over-etch of the core 1200 when forming interface surface 1208a. The modeling of this design used the same ranges for angle θ and recess R of the core 1200 from media-facing surface 1210. The results of the modeling are shown in the graphs of FIGS. 13-15, which are analogous to the results shown in FIGS. 9-11. These results show slightly worse (although still acceptable) thermal gradient and media temperature performance than the first configuration, although peg temperature is lower in this configuration, which may be an advantage in some situations. As with the previous example, the values R<40 nm and θ<30 degrees may provide acceptable performance, and even higher values of R and/or θ may be used.

In order to determine HF etching/corrosion resistance, NbO and TaO films were tested using 5% HF solution. NbO and TaO films were soaked in 5% HF solution overnight. Table 1 below shows the etching rate of TaO and NbO. As shown, TaO coatings show at least 67 times lower etching rate as compared with NbO.

TABLE 1

| Film | HF etch rate (A/s) |
|---|---|
| NbOx formulation #1 | 0.45 |
| NbOx formulation #1 | 0.67 |
| TaO | <0.01 |

Figure 16:
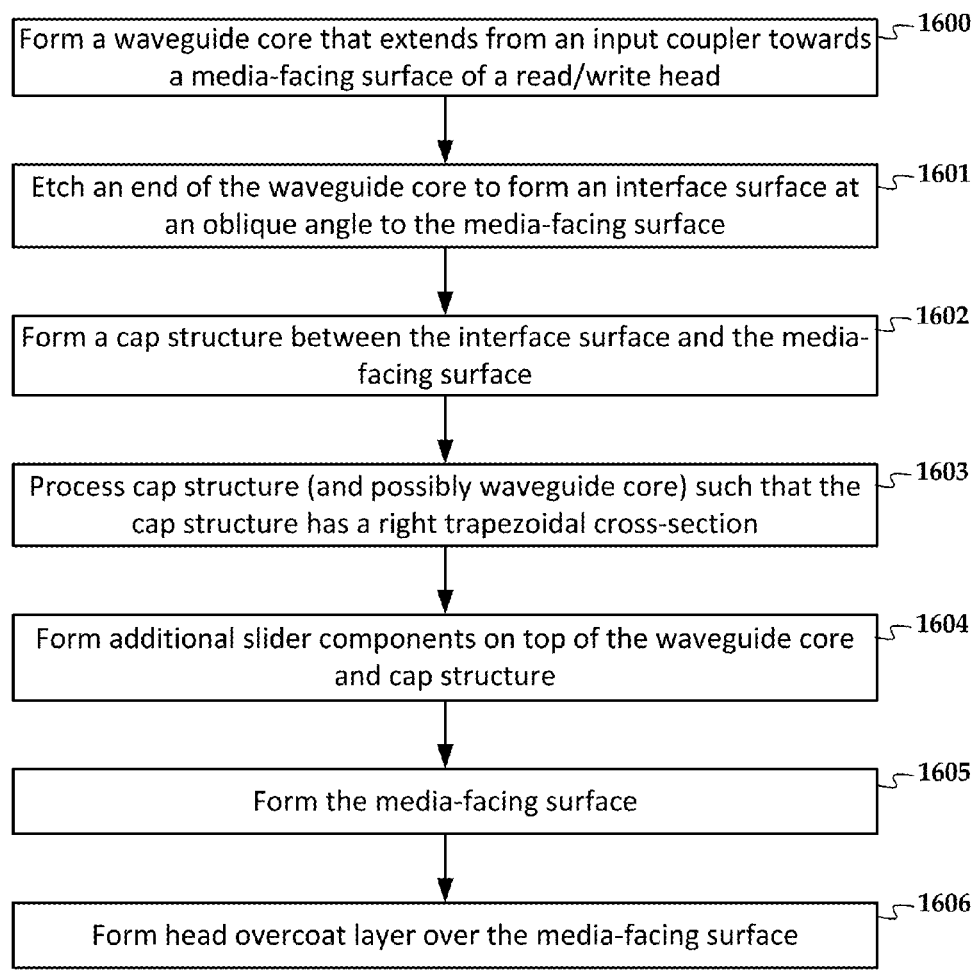

In FIG. 16, a flowchart shows a method according to an example embodiment. The method involves forming 1600 a waveguide core that extends from an input coupler towards a media-facing surface of a read/write head. An end of the waveguide core is etched 1601 near the media-facing surface to form an interface surface at an oblique angle to the media-facing surface. The interface surface lies on a cross-track parallel line. The etching extends below a lower surface of the core (over etch). A cap structure is then formed (e.g., deposited) 1602 between the interface surface and the media-facing surface. The cap structure (and possibly the waveguide core at the same time) is processed 1603 (e.g., planarized) such that the cap structure has a right trapezoidal cross-section in a plane normal to the cross-track parallel line. A long edge of the right trapezoidal cross-section faces towards an NFT.

Additional slider components (e.g., cladding layer, NFT, write pole, etc. are formed 1604 on top of the waveguide core and cap structure. After all the slider components are formed 1604, the media-facing surface is formed 1605 (e.g., via cleaving the wafer upon which the slider is formed, planarizing, etching air bearing features, etc.). A head overcoat layer is then formed 1606 on the media-facing surface, the head overcoat layer covering the cap structure.

Figure 17:
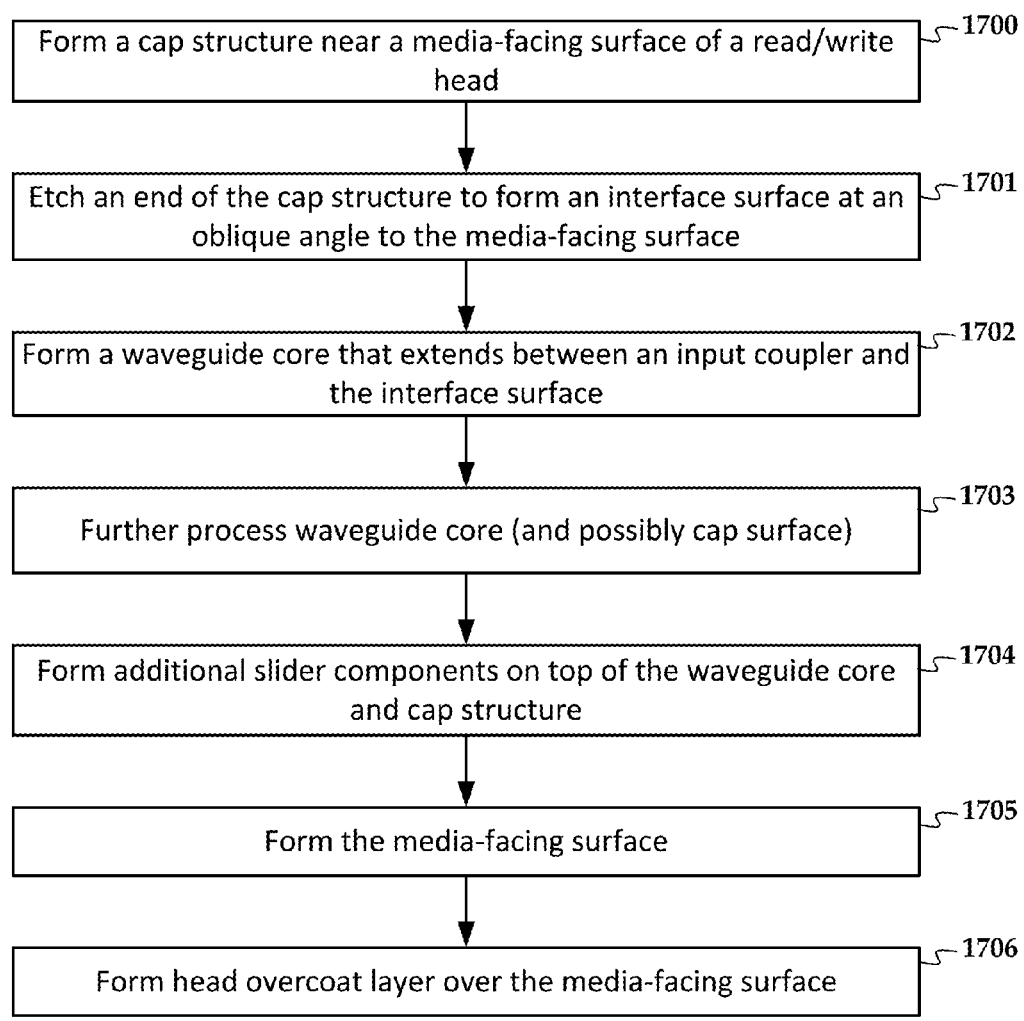

In FIG. 17, a flowchart shows a method according to another example embodiment. The method involves forming 1700 a cap structure near a media-facing surface of a slider. An end of the cap structure is etched 1701 to form an interface surface that faces away from and is at an oblique angle to the media-facing surface. The interface surface lies on a cross-track parallel line. The etching extends below a lower surface of the cap structure (over etch). The etching causes the cap structure to have a right trapezoidal cross-section in a plane normal to the cross-track parallel line. A short edge of the right trapezoidal cross-section faces towards an NFT.

A waveguide core is then formed 1702 that extends between the interface surface and an input coupler of the slider. The waveguide core (and possibly the cap structure at the same time) is further processed 1703 (e.g., planarized). Additional slider components (e.g., cladding layer, NFT, write pole, etc.) are formed 1704 on top of the waveguide core and cap structure. After all the slider components are formed 1704, the media-facing surface is formed 1705 (e.g., via cleaving the wafer upon which the slider is formed, planarizing, etching air bearing features, etc.). A head overcoat layer is then applied 1706 to the media-facing surface, the head overcoat layer covering the cap structure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A read/write head, comprising:
  a waveguide core extending from an input coupler towards a media-facing surface of the read/write head, a terminating end of the waveguide core facing and recessed from the media-facing surface;
  a cap between the terminating end of the waveguide core and the media-facing surface, the cap comprising a high index of refraction, high-corrosion resistant cap material that is different than a material used to form the waveguide core, the cap material comprising a compound that includes one of Ta, Hf, Zr and Y;
  a near-field transducer proximate the cap in a down-track direction; and
  a head overcoat on the media-facing surface that covers the cap.

2. The read/write head of claim 1, wherein an interface between the cap and the terminating end of the waveguide core is at an oblique angle to the media-facing surface and lies on a cross-track parallel line.

3. The read/write head of claim 2, wherein the cap has a right trapezoidal cross-section in a plane normal to the cross-track parallel line.

4. The read/write head of claim 3, wherein a first edge of the right trapezoidal cross-section facing the near-field transducer is shorter than a second edge of the trapezoidal cross-section facing away from the near-field transducer.

5. The read/mite head of claim 4, wherein the cap is thinner in the down-track direction than the waveguide core.

6. The read/write head of claim 4, wherein the first edge is less than 40 nm long, and wherein the oblique angle is less than 30 degrees.

7. The read/write head of claim 3, wherein a first edge of the right trapezoidal cross-section facing the near-field transducer is longer than a second edge of the trapezoidal cross-section facing away from the near-field transducer.

8. The read/write head of claim 7, wherein the cap is thicker in the down-track direction than the waveguide core.

9. The read/write head of claim 7, wherein the second edge is less than 40 nm long, and wherein the oblique angle is less than 30 degrees.

10. The read/write head of claim 1, wherein an interface between the cap and the terminating end of the waveguide core is parallel to the media-facing surface.

11. The read/write head of claim 1, wherein the waveguide core is formed of NbO and the cap is formed of TaO.

12. A read/write head, comprising:
- a waveguide core extending from an input coupler towards a media-facing surface of the read/write head;
- a cap between a terminating end of the waveguide core and the media-facing surface, the cap comprising a high index of refraction and high-corrosion resistance, wherein an interface between the cap and the terminating end of the waveguide core is at an oblique angle to the media-facing surface and lies on a cross-track parallel line such that the cap has a right trapezoidal cross-section in a plane normal to the cross-track parallel line;
- a near-field transducer proximate the cap in a down-track direction; and
- a head overcoat on the media-facing surface that covers the cap.

13. The read/write head of claim 12, wherein a first edge of the right trapezoidal cross-section facing the near-field transducer is shorter than a second edge of the trapezoidal cross-section facing away from the near-field transducer.

14. The read/write head of claim 13, wherein the cap is thinner in the down-track direction than the waveguide core.

15. The read/write head of claim 13, wherein the first edge is less than 40 nm long, and wherein the oblique angle is less than 30 degrees.

16. The read/write head of claim 12, wherein a first edge of the right trapezoidal cross-section facing the near-field transducer is longer than a second edge of the trapezoidal cross-section facing away from the near-field transducer.

17. The read/write head of claim 16, wherein the cap is thicker in the down-track direction than the waveguide core.

18. The read/write head of claim 12, wherein the cap is formed of a compound that includes one of Ta, Zr, Hf, Y, Ti combined with at least one of O and N.

19. The read/write head of claim 12, wherein the cap is formed of a compound that includes one of TaO, TaSiO, TaTiO, ZrO2, HfO2, TaZrO, TaCrO, TiAlO, YSZ, SiC, Si.

20. The read/write head of claim 12, wherein the cap is formed of a metal with high corrosion resistance and oxidation resistance, the metal including one of such as Pt, Rh, Ir, Ru, Pd, Ta, Hf, Zr and Y.

* * * * *